W. A. SEAMAN.
STEERING GEAR.
APPLICATION FILED MAY 23, 1908.
908,153.
Patented Dec. 29, 1908.
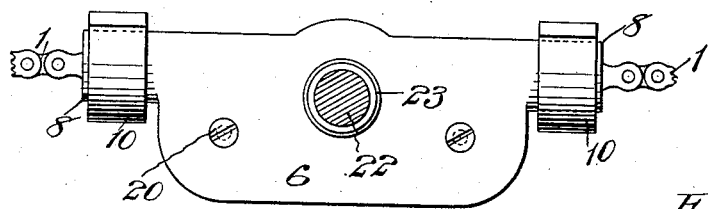
Fig. 1.
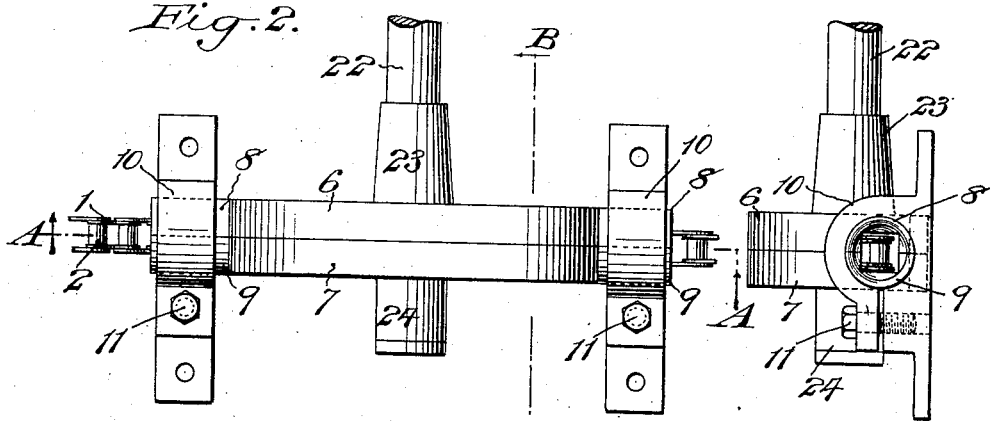
Fig. 2. Fig. 3.
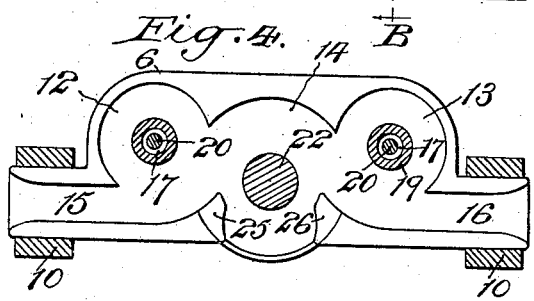
Fig. 4. Fig. 6.
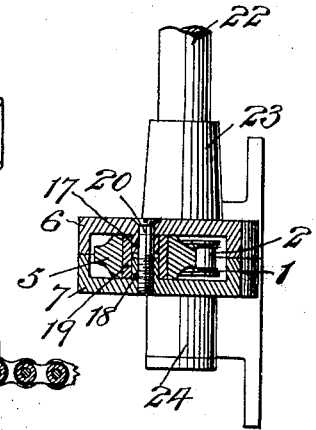
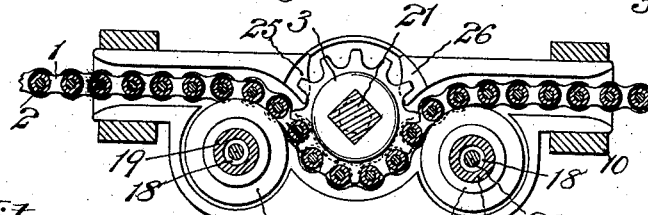
Fig. 5.
Witnesses:—
F. George Barry.
Henry Thieme.
Inventor:—
William A. Seaman
by attorneys
Brown & Seward

UNITED STATES PATENT OFFICE.

WILLIAM A. SEAMAN, OF LONG BRANCH, NEW JERSEY, ASSIGNOR TO ELIZABETH W. SEAMAN, OF LONG BRANCH, NEW JERSEY.

STEERING-GEAR.

No. 908,153.

Specification of Letters Patent.

Patented Dec. 29, 1908.

Application filed May 23, 1908. Serial No. 434,625.

*To all whom it may concern:*

Be it known that I, WILLIAM A. SEAMAN, a citizen of the United States, and resident of Long Branch, in the county of Monmouth and State of New Jersey, have invented a new and useful Improvement in Steering-Gear, of which the following is a specification.

The object of my invention is to provide a steering gear in which the operating parts are well protected and in which the cramping or doubling of the links of the chain as it passes around the sprocket wheel is prevented.

A further object is to provide certain improvements in the construction, form and arrangement of the several parts whereby the gear may be attached to its support in any desired position and in which the steering post may be clamped in any desired angular adjustment with respect to its support.

A practical embodiment of my invention is represented in the accompanying drawings in which—

Figure 1 represents the gear in top plan, the steering post being shown in cross section, Fig. 2 is a front view of the gear, Fig. 3 is an end view of the same, Fig. 4 is a section taken in the plane of the line A—A of Fig. 2, looking in the direction of the arrows, Fig. 5 is a view taken in the same plane, looking in the other direction, and Fig. 6 is a section taken in the plane of the line B—B of Fig. 2, looking in the direction of the arrows.

The sprocket chain of the steering gear is denoted by 1 and it is preferably provided with rollers 2 mounted on the rivets between the side plates of the chain links for reducing friction. The sprocket wheel around which the chain passes, is denoted by 3 and the two guide rollers between which the sprocket wheel 3 is located, are denoted by 4 and 5, the peripheries of which guide rollers are fitted to engage the rollers 2 of the chain.

The divided casing for housing the sprocket wheel and guide rollers comprises two separable members 6 and 7 having semicylindrical extensions 8 and 9 respectively forming together trunnions, which are rotatably supported in split bearings 10. These split bearings 10 are provided with clamp screws 11 arranged to clamp the casing in any desired rotary position. The bases of these bearings may be secured to the support for the steering gear in any desired position.

Communicating recesses 12, 13, 14, are provided in the two half sections 6 and 7 of the casing for receiving the two guide rollers 4, 5 and the sprocket wheel 3 respectively. Channels 15, 16, in the two half sections 6 and 7 of the casing lead from the guide roller recesses 12 and 13 respectively through the trunnions to the ends of the casing beyond the bearings 10. Each of the guide rollers is mounted to rotate within the casing by providing studs 17, 18, projecting from the sections 6 and 7 of the casing in alinement with each other, around each of which studs is fitted a bushing 19. The two half sections of the casing may be held together by screws 20 which pass centrally through the studs 17, 18.

The sprocket wheel 3 is mounted on the angular portion 21 of the steering post 22, which steering post is supported in its position in the casing by hollow extensions 23, 24, projecting outwardly from the half sections 6 and 7 respectively of the casing.

To prevent the cramping or doubling of the links of the chain as it passes into and out of engagement with the sprocket wheel 3, guides 25, 26, are provided which project into the sprocket wheel recesses 14 to a point nearer the axis of the sprocket wheel than its periphery, upon both sides of its teeth, which guides form extensions of the corresponding side walls of the channels 15, 16.

It will be seen that a steering gear constructed as herein set forth will have its operating parts well protected and also that any tendency of the chain to cramp or bind as it is passed through the casing is entirely prevented. It will also be seen that the steering gear may be placed in any desired position and the steering post arranged at any desired angle with respect to the support for the steering gear without interfering with the operation of the same.

It is evident that various changes might be resorted to in the construction, form and arrangement of the several parts without departing from the spirit and scope of my invention, hence I do not wish to limit myself to the structure herein set forth, but

What I claim is:

1. A steering gear comprising a sprocket wheel, a chain and a casing having channels therein for leading the chain to and from the sprocket wheel and guides in the casing projecting to a point nearer the axis of the sprocket wheel than its periphery for preventing the cramping or binding of the chain as it passes into and out of engagement with the wheel.

2. A steering gear comprising a sprocket wheel, a chain and a casing having channels therein for leading the chain to and from the sprocket wheel and guides in the casing projecting to a point nearer the axis of the sprocket wheel than its periphery upon both sides of its teeth for preventing the cramping or binding of the chain as it passes into and out of engagement with the wheel.

3. A steering gear comprising a sprocket wheel, guide rollers upon opposite sides of the sprocket wheel, a chain and a casing having channels therein for leading the chain to and from the sprocket wheel and guide rollers, and guides in the casing projecting to a point nearer the axis of the sprocket wheel than its periphery for preventing the cramping or binding of the chain as it passes into and out of engagement with the wheel.

4. A steering gear comprising a sprocket wheel, guide rollers upon opposite sides of the sprocket wheel, a chain and a casing having channels therein for leading the chain to and from the sprocket wheel and guide rollers and guides in the casing projecting to a point nearer the axis of the sprocket wheel than its periphery upon both sides of its teeth for preventing the cramping or binding of the chain as it passes into and out of engagement with the wheel.

5. A steering gear comprising a sprocket wheel, a chain, guide rollers upon opposite sides of the sprocket wheel and a closed casing for the sprocket wheel and guide rollers, said casing having channels therein for leading the chain to and from the sprocket wheel and guide rollers.

6. A steering gear comprising a sprocket wheel, a chain, guide rollers upon opposite sides of the wheel and a casing composed of two half sections, inclosing the sprocket wheel and guide rollers, said sections of the casing having channels therein for leading the chain to and from the sprocket wheel and guide rollers.

7. A steering gear comprising a sprocket wheel, a chain, guide rollers upon opposite sides of the sprocket wheel and a closed casing having communicating recesses therein for receiving the rollers and sprocket wheel and channels leading from said recesses through the ends of the casing through which the chain passes into and out of engagement with the sprocket wheel and guide rollers.

8. A steering gear comprising bearings, a casing journaled in said bearings, a steering post journaled in the said casing, a sprocket wheel fixed to said post within the casing, guide rollers upon opposite sides of the sprocket wheel and within the casing, said casing having channels leading through its ends into communication with the sprocket wheel and guide rollers and a chain arranged to pass through said channels into and out of engagement with the said sprocket wheel and guide rollers.

In testimony, that I claim the foregoing as my invention, I have signed my name in presence of two witnesses, this twenty-second day of May, 1908.

WILLIAM A. SEAMAN.

Witnesses:
F. GEORGE BARRY,
HENRY THIEME.